United States Patent [19]

Tressl et al.

[11] Patent Number: 4,827,129
[45] Date of Patent: May 2, 1989

[54] SWEEP DEVICE FOR A STORAGE LUMINESCENT SCREEN

[75] Inventors: Guenther Tressl, Bubenreuth; Bernhard Conrad, Erlangen, both of Fed. Rep. of Germany

[73] Assignee: Siemens Aktiengesellschaft, Berlin and Munich, Fed. Rep. of Germany

[21] Appl. No.: 152,342

[22] Filed: Feb. 4, 1988

[30] Foreign Application Priority Data

Feb. 17, 1987 [DE] Fed. Rep. of Germany ....... 3704994

[51] Int. Cl.⁴ .......................... H04N 1/028; H04N 1/06
[52] U.S. Cl. ............................... 250/327.2; 250/484.1; 358/290; 358/292
[58] Field of Search ................. 250/327.2 D, 327.2 E, 250/327.2 F, 327.2 L, 484.1 B; 358/293, 292, 291, 290, 289

[56] References Cited

U.S. PATENT DOCUMENTS

| | | | |
|---|---|---|---|
| 1,663,308 | 3/1928 | Jenkins | 346/108 |
| 1,800,000 | 4/1931 | Zworykin | 358/292 |
| 2,044,831 | 6/1936 | Chereau et al. | 358/290 |
| 2,298,911 | 10/1942 | Young | 358/290 |
| 3,264,407 | 8/1966 | Headd et al. | 358/293 |
| 3,566,119 | 2/1971 | Lewis | 250/353 |
| 4,692,813 | 9/1987 | Conrad et al. | 358/294 |
| 4,737,641 | 4/1988 | Lange et al. | 250/327.2 |
| 4,743,758 | 5/1988 | Chan et al. | 250/327.2 |

FOREIGN PATENT DOCUMENTS 0073086 3/1983 European Pat. Off. .
34613 3/1977 Japan .................................. 358/290

*Primary Examiner*—Janice A. Howell
*Assistant Examiner*—Constantine Hannaher
*Attorney, Agent, or Firm*—Hill, Van Santen, Steadman & Simpson

[57] ABSTRACT

A sweep device for a storage luminescent screen, in which x-ray images are latently stored, includes a drum having an interior on which the storage screen is mounted, a stimulating radiation source which generates a scan beam of stimulating radiation to cause the storage screen to luminesce picture element-by-picture element, and a deflecting mirror disposed in the center of the drum and rotatable relative to the drum to direct the scan beam onto the screen. The deflecting mirror is disposed in the middle of a measuring head, and the drum is shifted relative to the deflecting mirror for line scanning. For acquiring the light emitted by the storage luminescent screen, a curved light conductor is attached to the measuring head. The curve light conductor has a first end face disposed at the circumference of the measuring head which completely surrounds the point of incidence of the scan beam on the storage luminescent screen. The curve light conductor has a second end face disposed substantially in the middle of the measuring head perpendicular to the drum axis, and opposite the light-sensitive surface of an emitted radiation detector. The detector converts the emitted radiation into an electrical signal sequence.

11 Claims, 3 Drawing Sheets

SWEEP DEVICE FOR A STORAGE LUMINESCENT SCREEN

BACKGROUND OF THE INVENTION

1. Field of the Invention

The present invention is directed to a sweep or read device for a storage luminescent screen in which x-ray images are latently stored, and in particular to such a device having a stimulating radiation source which generates a scan beam of stimulating radiation which causes the storage screen to luminesce, and a light conductor which conducts the emitted radiation to a radiation detector to convert the emitted light into an electrical signal sequence.

2. Description of the Prior Art

A sweep device having a drum in which the storage screen is mounted, a rotating deflecting mirror disposed in the center of the drum which directs the radiation from the stimulating radiation source onto the storage screen and a light conductor disposed for conducting the emitted light from the storage screen to a detector is described in European Application No. EP-A-0 179 247, corresponding to U.S. Pat. No. 4,692,813. This device undertakes a pixel-by-pixel scanning of the storage screen. A circular light-conducting plate of silica glass is connected to the detector, with the deflecting mirror disposed in the center of the plate. The plate conducts the light emitted by the luminescing storage screen to the light-sensitive entry face of the detector. For line-by-line scanning of the storage screen, the drum is shifted relative to the scanning and signal acquisition system, so that the rotating scan beam scans the screen line-by-line. Optimum light guidance is not, however, achieved using the circular light-conducting plate because a substantial portion of the light emitted by the storage screen is lost due to absorption or during the conductance of the light through the plate.

To avoid this problem, in several embodiments of the aforementioned European application and United States patent, the light conductor is disposed outside of a transparent drum. The simulating radiation is directed by the deflecting mirror through the transparent drum and onto the storage screen, with the resulting emitted radiation being guided to the detector via mirror faces of the light conductor. A problem with this solution, however, is that relatively large detectors must be used. It is possible to use light conductor having a plurality of mirror faces, so that multiple deflection within the conductor ensues, thereby permitting the use of smaller detectors. Such multiple deflection light conductors are, however, relatively difficult to manufacture. Moreover, because the detector must be arranged outside of the drum, the light conductor must exhibit a length which corresponds to the length of the storage screen to be swept. Light losses due to absorption are therefore increased.

SUMMARY OF THE INVENTION

It is an object of the present invention to provide a sweep or read device for a storage luminescent screen of the type described above wherein a high percentage of the light emitted by the storage screen can be supplied to the detector.

It is a further object of the present invention to provide such a sweep or read device which has a relatively compact structure.

These and other objects are achieved in accordance with the principles of the present invention in a sweep device wherein the deflecting mirror is attached in the middle of a measuring head inside the drum, and a curved light conductor is attached to the measuring head. The curved light conductor has a first end face disposed at the circumference of the measuring head, and completely surrounding the point of incidence of the scan beam on the storage screen. The curved light conductor has a second end face disposed in the middle of the measuring head perpendicular to the drum axis, and lying opposite the light-sensitive face of the detector. In this device, a large portion of the light emitted by the storage screen can be captured by the light conductor. As a result of the curved shape of the light conductor, substantially all of the captured light is supplied to the detector. Substantially no loss due to light exit occurs at the lateral walls as a consequence of total internal reflection in the curved conductor. Moreover, all of the light can emerge from the second end face of the conductor, since no reflection occurs at that boundary. If the deflecting mirror and the light conductor are both rigidly attached to the measuring head, the entire measuring head can be rotated at a high speed.

The light conductor can consist of simple optical material, for example, acrylic glass. The conductor may have a bore through which the deflected scan beam proceeds, which terminates in the middle of the first end face. The scan beam in this embodiment is thus not guided through the material comprising the light conductor, so that no absorption of the scan beam occurs, and additionally no diffusely scattered portions of the scan beam can proceed onto the detector. The bore is adapted to the shape of the focused scan beam, and can be as small as possible when having a conical shape for accommodating a laser beam. The diameter of the bore is smallest at the first end face of the light conductor. The influences on the light conduction of the emitted light are further reduced by polishing the inside wall of the bore.

Light conduction is further improved within the light conductor in an embodiment wherein the conductor conically expands proceeding from its first end face, at least expanding in selected regions. An advantageous light conduction is achieved in an embodiment wherein the light conductor has a first side wall which is arcuate at least at certain regions, this side wall forming an angle of 90° with the first end face. Total reflection of the entire light, with the simultaneous possibility of a simple fastening to the measuring head, is achieved in an embodiment wherein the second side wall of the light conductor describes an angle greater than 90° with the first end face, and the second side wall is also curved, at least through selected regions, and has straight regions for accepting the fastening elements. The straight regions are disposed at a distance from the first end face.

High scan speeds can be achieved in an embodiment wherein the measuring head has an essentially cylindrical housing, which is connected to a drive motor provided with a hollow shaft.

DESCRIPTION OF THE PREFERRED EMBODIMENTS

Figure 1:
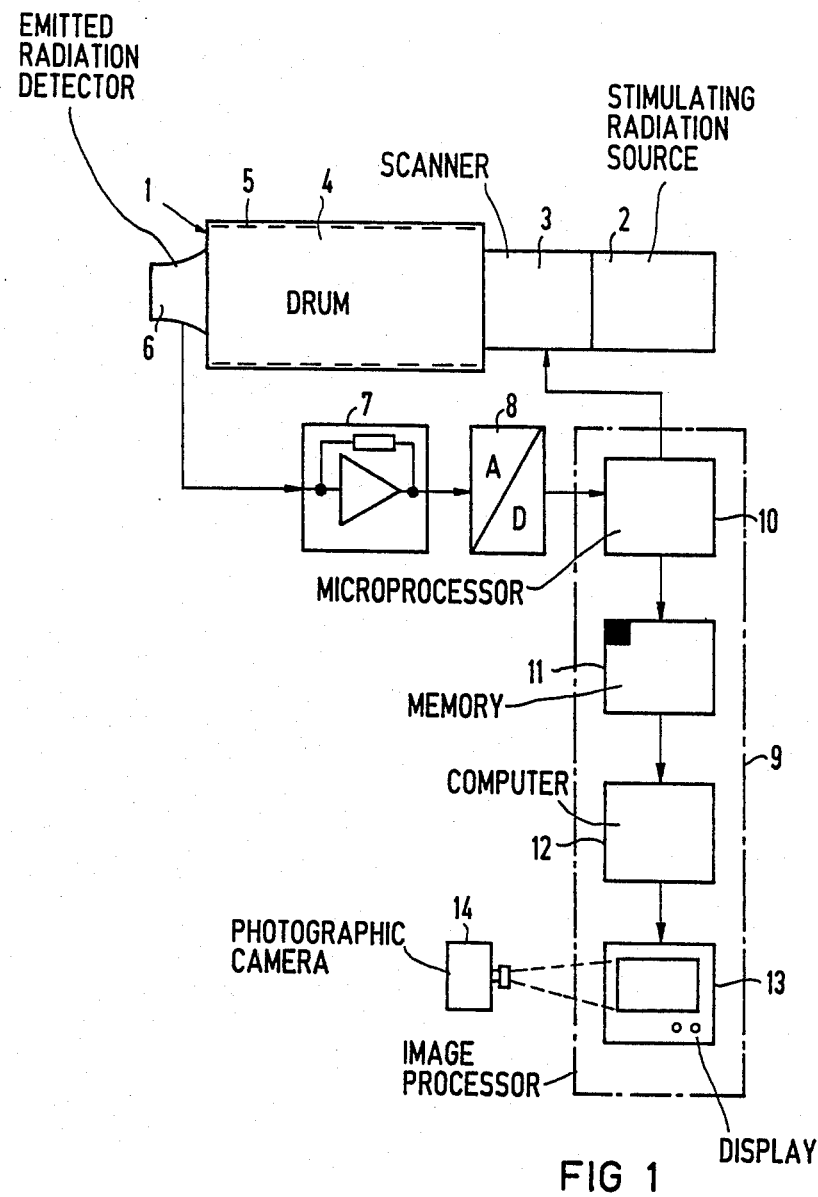
FIG. 1 is a schematic block diagram of a sweep device for a storage luminescent screen constructed in accordance with the principles of the present invention.

A sweep or read device 1 for converting stored image signals, particularly x-ray images, latently stored in a luminescent storage screen is generally shown in FIG. 1. The device includes a stimulating radiation source 2 which generates a scan beam which is conducted, as shown in greater detail in FIG. 2, via a scanner 3 onto a foil-like storage luminescent screen 5 secured in the interior of a drum 4. The storage screen 5 is caused to luminesce by the stimulating radiation, and emits radiation which is detected by an emitted radiation detector 6, for example, a photomultiplier. The output signals of the detect 6 are supplied via an amplifier 7 and an analog-to-digital converter 8 to an image processor 9.

The image processor 9 includes a microprocessor 10 connected to a memory 11 into which the digital signals from the detector 6 are entered. A computer 12 is connected to the memory 11 which converts the stored signals into a video signal which can be reproduced on a display 13. A photographic camera 14 having a field view directed at the screen of the display 13 generates a permanent record of the video image. The microprocessor 10 is connected to the scanner 3 for synchronization of the scanning of the storage screen 5.

Figure 2:
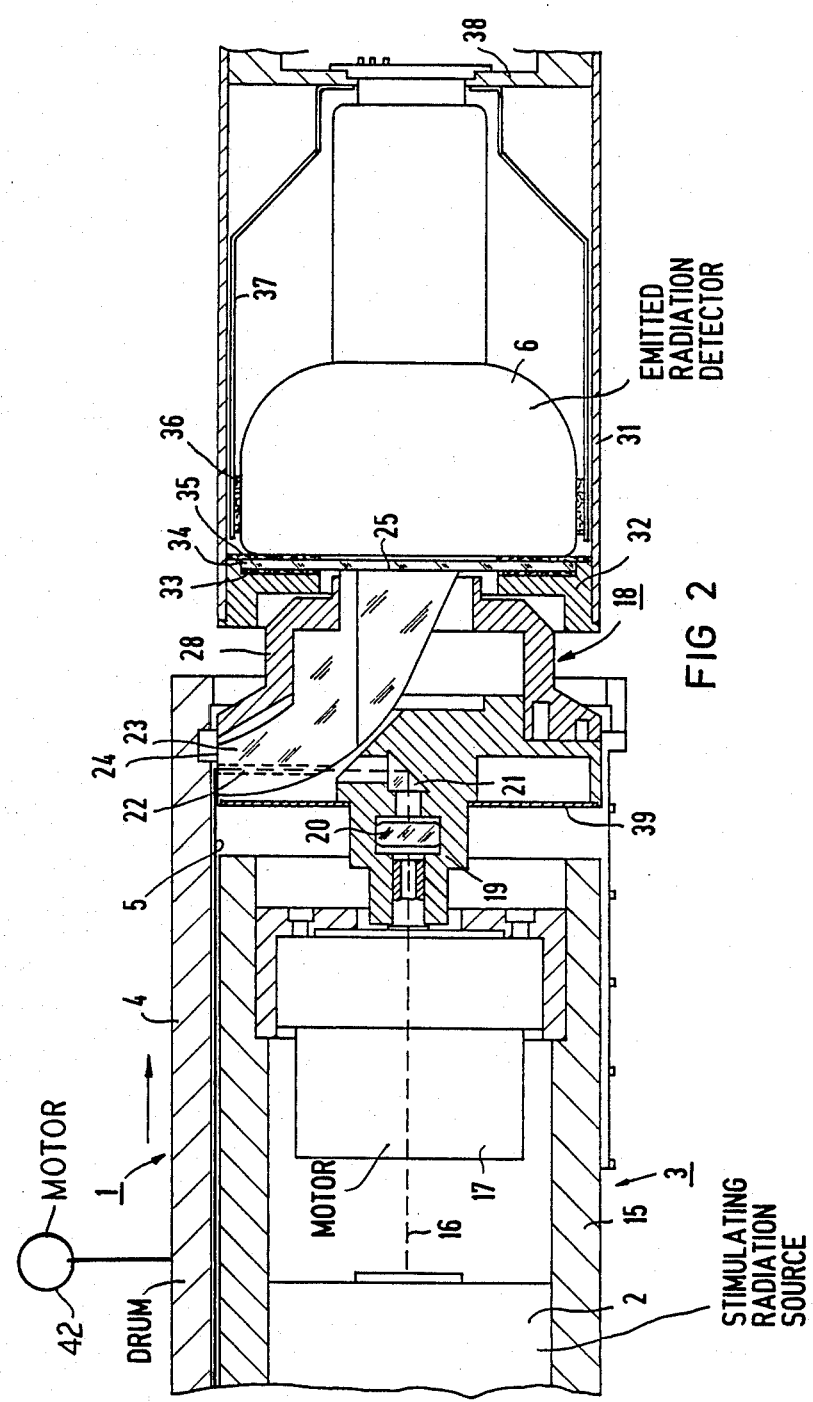
FIG. 2 is side sectional view of a portion of a sweep device constructed in accordance with the principles of the present invention.

The components of the sweep device for directing stimulating radiation onto, and acquiring emitted radiation from, the storage screen 5 are shown in FIG. 2. As noted above, the storage screen 5 is secured on the interior wall of the drum 4. A mounting tube 15, in which the stimulating radiation source 2 is secured, is disposed inside the drum 4. The radiation source 2 may include a 30 mW helium-neon laser which generates a light beam having a first wavelength. The radiation source 2 also includes a beam expanding system (not shown) which expands the light beam to a diameter of, for example, 4 mm, which is used as the scanning beam 16. The scanning beam 16 of the radiation source 2 proceeds through a hollow shaft of a motor 17 secured to the front end of the tube 15. The hollow shaft concentrically surrounds the axis of the drum 4. A measuring head 18 is attached to the shaft, which is driven by the motor 17 at a speed of, for example, 4,000 rpm. The measuring head 18 has a carrier 19 attached to the shaft of the motor 17. The scanning beam 16, after passing through the hollow shaft of the motor 17, passes through a focusing unit 20 secured in the carrier 19, and is incident on a triangular deflecting prism 21. The prism 21 acts as a deflecting mirror, and directs the scanning beam 16 out of the direction of the drum axis in a radial direction.

The scanning beam 16 then proceeds through a bore 22 of a light conductor 23 (shown in greater detail in FIGS. 3 and 4) and is incident on a point of the storage luminescent screen 5. The screen 5 emits light of a second wavelength in accord with the stored latent radiation image.

The light conductor 23 has a first end face 24 disposed at a slight distance, for example 3.5 mm, from the storage screen 5. The bore 22 is disposed substantially in the middle of the first end face 24, so that the point of incidence of the scanning beam 16 on the storage screen 5 is completely surrounded by the first end face 24 of the light conductor 23. A substantial portion of the light emitted by the screen 5 can thus penetrate into the first end face 24.

Figure 3:
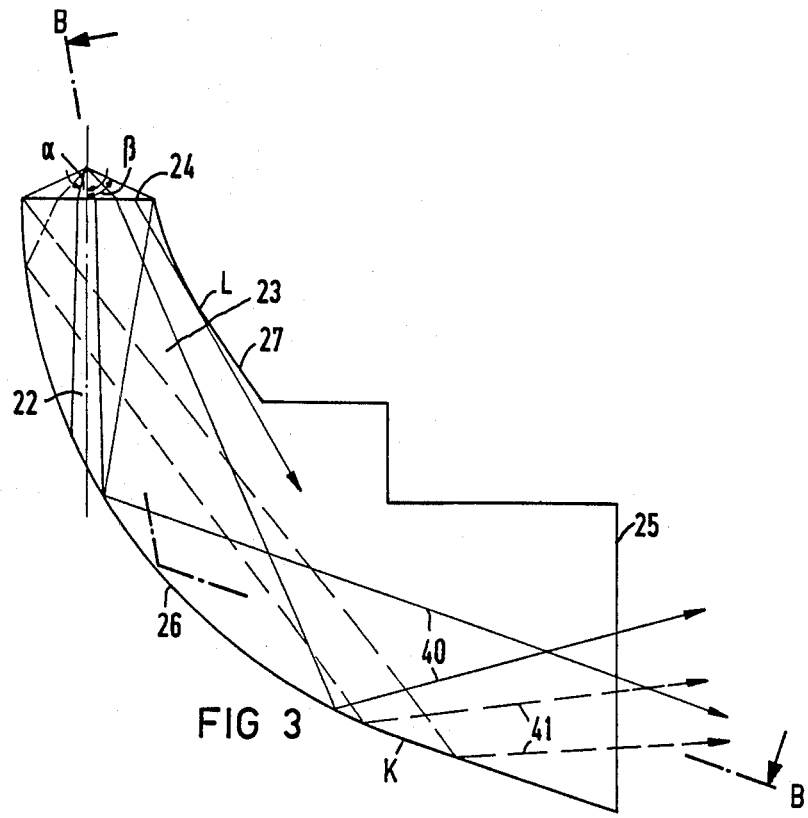
FIG. 3 is a side sectional view of a curve light conductor for use in the sweep device constructed in accordance with the principles of the present invention.

The light rays which have entered the conductor 23 through the first end face 24 are guided, as shown in FIG. 3, are totally reflected at the side walls 26, 27, 29 and 30, as indicated by arrows 40 and 41, so as to completely emerge at a second end face 25. The second end face 25 is disposed perpendicularly relative to the first end face 24. A first side wall 26 is curved, at least over regions thereof. The first side wall 26 and the first end face 24 form a right angle at their intersection. The first side wall 26 proceeds on a circular arc of a radius up to a point K. After the point K, the first side wall 26 continues on a straight line. The opposite, second side wall 27 of the light conductor 23 forms an angle greater than 90° with the first end face 24. In a first section, the second side wall 27 proceeds along a circular arc having a smaller radius than the first side wall 26, and having a center offset relative thereto. The remainder of the second side wall 27 is angled, forming a step or nose permitting the light conductor 23 to be fastened to a mount 28 of the measuring head 18 connected to the carrier 19. The open side of the measuring head 18 is clad with a cover plate 39 to promote good aerodynamics operation of the measuring head 18.

Figure 4:
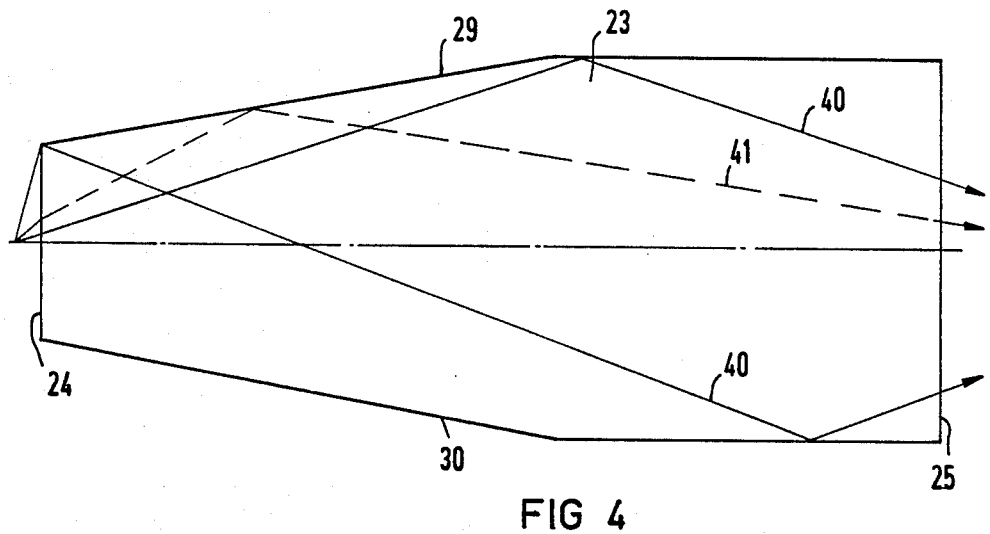
FIG. 4 is a sectional view of the light conductor shown in FIG. 3 taken along line B—B.

The light conductor 23 shown in FIG. 3 is shown in FIG. 4 along angled section B—B. The third and fourth side walls 29 and 30 are straight, but conically expand proceeding from the first end face 24 and become substantially parallel as they approach the second end face 25. This permits the light conductor 23 to acquire a larger portion of the light emitted by the screen 5.

As shown in FIG. 2, a second retaining tube 31, having an axis aligned with the axis of the first retaining tube 15, is disposed at the measuring head 18 opposite the retaining tube 15. The second retaining tube 31 has a support 32 with seating surfaces provided with a felt 33, on which an optical absorbing filter 34 (BG 3) is placed. The filter 34 has a stopband of the first wavelength so as to eliminate scattered light from the scanning beam 16. The detector 6 has an entry face supported by a disk 35 with a central aperture therein disposed at the edge of the filter 34. The detector 36 is laterally held by a felt ring 36 and shielding 37 consisting of, for example, mumetal. The shielding 37 surrounds the overall lateral region of the detector 6, and is secured to a retainer 38 which locks to the base of the detector 6.

The light emerging from the second end face 25 of the conductor 23 passes through the absorbing filter 34 which is disposed a slight distance, for example, 2 mm, from the second end face 25. As shown, the optical absorbing filter 34 may be disposed at a slight distance from the glass bulb of the detector 6. The filter 34 may alternatively be directly coupled to the glass bulb, or may be coupled thereto via further optical means so that no additional light loss arises.

The ends of the two retaining tubes 15 and 31 are rigidly connected to the sweep device 1 by bearings (not shown). The drum 4 is secured moveable slowly toward the right from the illustrated initial position shown in FIG. 2 by a motor 42, so that the scanning beam 16, which rotates inside the drum 4 as a result of the rotation of the measuring head 18, is incident on a new region of the storage screen 5 after each revolution. The surface of the storage screen 5 is thus completely successively scanned line-by-line. This linear movement of the drum 4 is schematically indicated by the arrow.

In order to avoid the necessity of precisely adjusting the position of the scanning beam 16, the bore 22 has a diameter of, for example, 2 mm at the first end face 24. The bore 22 is in the shape of a cone, with a lower diameter, i.e., closest to the prism 21, of, for example, 3.5 mm. The inside wall of the bore 22 is polished so that the light in the light conductor 23 either passes through this boundary or is totally reflected, dependent on the angle of incidence. In both cases, the further course of the light ray is usually such that the light is conducted to the second end face 25.

A loss, however, does occur upon entry of the light emitted by the storage screen 5 into the first end face 24, because the light which strikes the inside wall of the bore 22 inside the aperture passes through the light conductor 23, and almost always emerges at one of the side walls. This loss, however, is maintained low as a result of the distances of 3.5 mm of the first end face 24 from the storage screen 5. Given a half aperture angle $\alpha$ of, for example, 16°, a loss of 8% results.

Again due to the limited input aperture, the 3.5 mm spacing results in a loss at large angles of incidence. This loss is maintained low by making the end face 24 adequately large. If this face has a width of, for example, 20 mm, all light rays in the illustrated plane impinge the light conductor 23 at an angle of incidence $\Gamma$ up to 70°, so that approximately 88% of the emitted light is acquired.

Due to the loss in the bore 22, 80% of the emitted light is thus incident on the first end face 24 of the light conductor 23. The surface reflection averages 5.5% given a refractive index $n=1.5$. This means that about 75% of the light emitted by the storage screen 5 enters the light conductor 23.

An absorption of about 7% occurs given the use of acrylic glass as the material comprising the light conductor 23. A further loss arises due to reflection at the second end face 25. The angle of incidence on the second end face 25 is less than 28°. Again given a light conductor material of acrylic glass having a refractive index of $n=1.5$, less than a 5% reflection loss occurs on the average. The balance of the light which is conducted to the absorbing filter 34 thus amounts to approximately 67% of the emitted light.

It must also be taken into consideration that the angle at the second end face 25 must be less than 42°, so that the light is not blocked by total reflection. This angle should preferably be selected considerably smaller so that no increased surface reflection loss occurs.

As a result of the widening of the light conductor from, for example, 20 mm at the first end face 24 to 40 mm at the second end face 25 over a length of 55 mm, the third and fourth side walls 29 and 30 are slanted at approximately 10°, so that the angle of incidence is limited to 20°. As a result of the shape of the first and second side walls 26 and 27, the angle of incidence onto the second end face is also limited to 20°, so that a maximum angle of incidence of 28° results from the two angles, which are perpendicular to each other.

For example, the second side wall 27 may form an angle of 105° with the first end face 24, so that the light reflected by the second side wall 27 cannot emerge out of the first side wall 26. As noted above, the light conductor 23 also conically widens in the plane shown in FIG. 3. Because the light entering into the first end face 24 in this embodiment is incident on the second side wall 27 only up to the point L, this side wall can be arbitrarily shaped beyond this region, as shown in FIG. 3, without degrading the light conduction.

The light rays shown in FIGS. 3 and 4 with arrows 40 proceed in the plane of the drawing, whereas the light rays referenced with arrows 41 proceed outside the plane of the drawing.

Although modifications and changes may be suggested by those skilled in the art it is the intention of the inventors to embody within the patent warranted hereon all changes and modifications as reasonably and properly come within the scope of their contribution to the art.

We claim as our invention:

1. A sweep device for reading information stored as a latent image in a luminescent storage screen, said storage screen luminescing corresponding to the image stored therein upon irradiation of said screen with stimulating radiation, said device comprising:

a drum having an interior surface on which said screen is disposed, said drum having a longitudinal axis;

means for generating a scanning beam comprised of stimulating radiation parallel to said longitudinal axis;

a measuring head disposed inside said drum on said longitudinal axis and having a circumference disposed spaced from said storage screen;

means in said measuring head for deflecting said scan beam onto a point in a center of an area of said storage screen;

means for rotating said measuring head about said longitudinal axis;

means for displacing said drum relatively to said measuring head along said longitudinal axis so that the scanning beam sweeps the entire surface of said storage screen;

means for converting light emitted by said storage screen caused by said scanning beam into electrical signals, said means for converting having a light entry face disposed perpendicularly to said longitudinal axis; and solid means in said measuring head for conducting light from said storage screen to said light entry face of said means for converting, said means for conducting having a first end face disposed on said circumference of said measuring head parallel to said longitudinal axis, said first end face being face to face with said area, a second end face disposed adjacent said light entry face of said means for converting perpendicularly relative to said longitudinal axis, and a curved side wall joining said first and second end faces.

2. A sweep device as claimed in claim 1, wherein said means for deflecting and said means for conducting are disposed in said measuring head such that a portion of said means for conducting is between said means for deflecting and said circumference of said measuring head, and wherein said means for conducting has a bore therein disposed such that the scanning beam deflected by said means for deflecting passes unimpeded through said bore to said storage screen.

3. A sweep device as claimed in claim 2, wherein said bore is conical and has a smallest diameter at said first end face of said means for conducting.

4. A device as claimed in claim 2, wherein said bore has an inside wall, and wherein said inside wall is polished.

5. A sweep device as claimed in claim 1, wherein said light conductor has side walls diverging at least in regions from said first end face to said second end face.

6. A sweep device as claimed in claim 5, wherein said side walls conically diverge at least in regions.

7. A sweep device as claimed in claim 1, wherein said curved side wall is arcuate at least in a region thereof, and wherein said first side wall forms an angle of 90° with said first end face.

8. A sweep device as claimed in claim 1, wherein said means for conducting has a second side wall forming an angle greater than 90° with said first end face, and said second side wall being curved at least in regions thereof.

9. A sweep device as claimed in claim 8, wherein said second side wall has a straight region, and wherein said means for conducting is held in said measuring head at least at said straight region.

10. A sweep device as claimed in claim 1, wherein said measuring head has a cylindrical closed housing.

11. A sweep device as claimed in claim 1, wherein said means for rotating said measuring head is a motor having a hollow shaft through which said scanning beam proceeds.

* * * * *